(12) United States Patent
Picciotto et al.

(10) Patent No.: US 8,422,016 B2
(45) Date of Patent: Apr. 16, 2013

(54) NON-CONTACT AND CONTACT COLOR SENSOR DEVICE

(75) Inventors: Carl Picciotto, Bellevue, WA (US); Jeffrey M DiCarlo, Menlo Park, CA (US); Miheer Bhachech, Mountain View, CA (US); Melanie M Gottwals, San Jose, CA (US); Nathan M Moroney, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 371 days.

(21) Appl. No.: 12/846,489

(22) Filed: Jul. 29, 2010

(65) Prior Publication Data
US 2012/0026498 A1 Feb. 2, 2012

(51) Int. Cl.
*G01J 3/46* (2006.01)
(52) U.S. Cl.
USPC .......................................................... 356/402
(58) Field of Classification Search .................. 356/402
See application file for complete search history.

(56) References Cited

U.S. PATENT DOCUMENTS

| 6,573,984 | B2 | 6/2003 | Jung et al. | |
|---|---|---|---|---|
| 7,227,648 | B2 | 6/2007 | Weinhold | |
| 7,466,416 | B2 | 12/2008 | Baker et al. | |
| 2006/0086477 | A1 | 4/2006 | Holub | |
| 2006/0274921 | A1* | 12/2006 | Rowe | 382/124 |
| 2008/0218780 | A1 | 9/2008 | Shimbaru | |
| 2008/0309924 | A1 | 12/2008 | Jung et al. | |
| 2009/0320761 | A1* | 12/2009 | Grave et al. | 119/51.02 |

FOREIGN PATENT DOCUMENTS

JP 62019986 1/1987
WO WO2004106872 A1 12/2004

OTHER PUBLICATIONS

Anaheim Scientific division of BK Precision; RGB Color Analyzer; models: H500; www.anaheimscientific.com, 2009.
Pending U.S. Appl. No. 12/569,226, filed Sep. 29, 2009; Nathan Moroney et al.

* cited by examiner

*Primary Examiner* — Tu Nguyen

(57) ABSTRACT

An apparatus for color sensing is disclosed. The apparatus includes a set of color sensor tolerances for a Non-Contact color sensor device; and a Contact color sensor device, conforming to the set of color sensor tolerances.

21 Claims, 2 Drawing Sheets

NON-CONTACT AND CONTACT COLOR SENSOR DEVICE

CROSS-REFERENCE TO RELATED OR CO-PENDING APPLICATIONS

This application relates to the following co-pending U.S. and P.C.T. Patent Applications:

Ser. No. 12/569,226, entitled "Color Measurement Device," filed on Sep. 29, 2009.

Ser. No. 12/536,643, entitled "Color Analysis System And Method," filed on Aug. 6, 2009.

Serial No. PCT/US2009/060704, entitled "Stabilized Light Source Having Luminance Feedback Control," filed on Oct. 14, 2009.

Ser. No. 12/436,240, entitled "Color Analysis System And Method," filed on May 6, 2009.

Ser. No. 11/829,233, entitled "Optimizing Characterization Values Of Image Capture Apparatus Components," filed on Jul. 27, 2007.

These related applications are commonly assigned to Hewlett-Packard Development Co. of Houston, Tex.

BACKGROUND OF THE INVENTION

The present invention relates generally to color sensors, and more particularly to "Non-Contact" and "Contact" color sensors.

BRIEF DESCRIPTION OF THE DRAWINGS

Some examples of the invention are described in the following figures.

DETAILED DESCRIPTION

Figure 1:
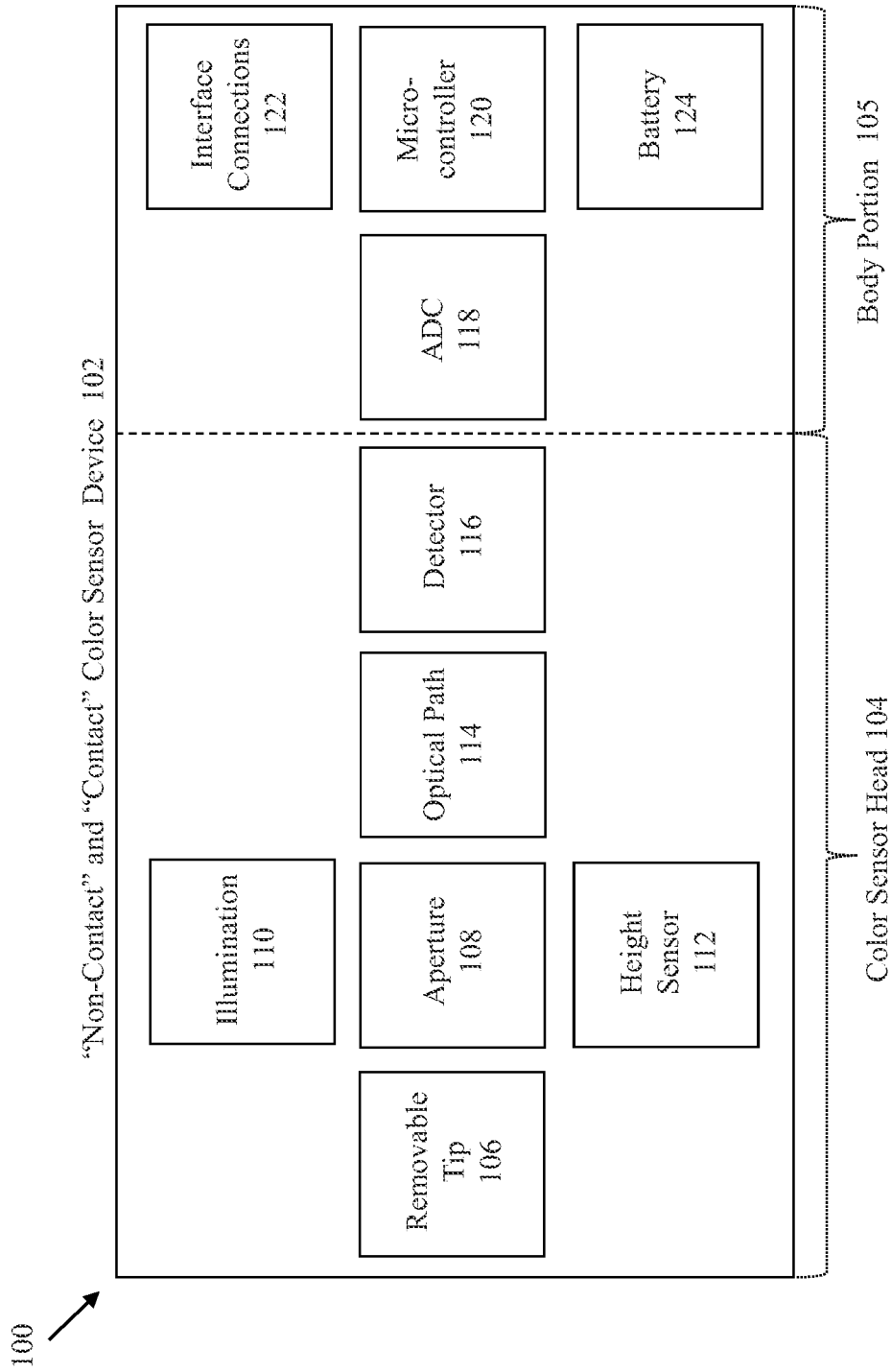
FIG. 1 is one example embodiment of a "Non-Contact" and "Contact" color sensor device.

Customers of Print Service Providers (PSPs), and other industrial color manufacturers, are increasingly requiring more stringent levels of color accuracy from their production workflows. Increasingly, auditing of color quality is required at different points in the supply chain, so as to better verify that the product color that was ordered is the product color which is delivered. Such color auditing is also important when industrial providers, such as PSPs, implement their own quality control procedures for identifying potential problems that might degrade their product color output.

Unfortunately, accurate color measurement is a complex endeavor, and any mismatch between color sensors used during product color production, and color sensors used during product color auditing and quality control, can result in color data set that differ substantially. This discrepancy is because during production, "Non-Contact" color sensor are used, while during auditing and quality control "Contact" color sensors are used, resulting in a constant source of confusion and frustration between industrial providers (e.g. PSPs) and their customers and/or quality control team.

"Non-Contact" and "Contact" color sensors generate such mismatched color data since they are intentionally designed and built for very different customers, markets, environments, uses, etc. and thus employ very different optical geometries and technologies. "Non-Contact" and "Contact" color sensors will thus produce color data that does not match that casts suspicion on the color accuracy of the product produced, and, by extension, on the capabilities of the PSP, or other industrial color manufacturer, that produced them.

An example set of differences between the optical geometries and technologies of "Non-Contact" and "Contact" color sensors is now discussed.

"Non-Contact" color sensors are almost, if not completely, designed for industrial color sensing applications. "Non-Contact" color sensors are typically optimized to sense color on a limited number of known materials (e.g. web-press paper, plastic rolls, colored liquids, etc.), and a finite set of known color space domains. They are designed to an industrial web-press form factors and are amenable to high-end price-points which employs one set of sensor geometry and sensor technology. "Non-Contact" color sensors also include "a lot more optics", as is required by such high-speed, constant-operation industrial applications. Since color measurements vary with distance, "Non-Contact" color sensors may include "height sensing" optics for measuring variations in the distance between the color surface (e.g. the "web" in a web-press) and the color sensor.

In contrast, "Contact" color sensors are designed for intermittent, hand-held crafts-shop-like color sensing applications. They are used to sense color on quite a wide variety of unpredictable materials (e.g. practically at the user's complete discretion) and an quite divergent set of color space domains (e.g. oil paintings, drapes, medical applications, teeth, biology, etc. "Contact" color sensors are designed with a wide variety of "hand-held" based form factors (e.g. they typically include bulky multi-unit form factors with base units connected by cable to a hand-held color sensing unit). The price of "Contact" color sensors must also fall at or below certain rigid price-points which tend to drive selection of a low-cost, basic set of sensor geometries and sensor technologies. "Contact" color sensors do not include height sensing because such "Contact" devices have a "fixed tip" whose distance is known and does not change. Thus, generally, "Contact" color sensors are built to appeal to as broad a market as possible, in an attempt to be everything to everybody who uses them.

Even if a "Contact" and "Non-Contact" color sensors had identical specification sheets, or conformed to the same overall standard, the differences in optical geometry and technology used to meet those specifications would be very different, and it is those differences that lead to different color data measurement. Due to the increased use of "auditing" and other "quality control" tools that employ both "Contact" and "Non-Contact" color sensors there is a need for greater color measurement agreement between these devices.

The present invention addresses and remedies many, if not all, of the problems discussed above.

Some of the advantages of the present invention include teaching a color sensor device geometry and technology that operates both in a "Non-Contact" mode/configuration (e.g. within a web-press) and in a "Contact" mode/configuration (e.g. hand-held, mounted on a scanning robot, etc.), thereby enabling a more accurate matching between color measurements taken in either the "Non-Contact" or "Contact" mode (e.g. inside and outside of a web-press).

Such dual "Non-Contact" or "Contact" color sensors, having matching optical geometries and technologies, further increases measurement agreement since their color measurement's can be processed and compared using the color sensor's own native (i.e. raw) colorspace, thus avoiding the inevitable errors that arise from colorspace transformations (i.e. in other words, it would not be necessary to convert the raw reflectance color measurement data into some other colorspace, such as CIELAB).

Thus the dual mode "Non-Contact" or "Contact" color sensor device enables more accurate auditing of product color production produced by PSPs or other industrial users, since the color measured by a handheld version of the color sensor would agree well with the color measured by a web-press mounted color sensor, resulting in fewer false negatives.

In graphic design applications of the "Non-Contact" or "Contact" color sensor device, a designer can use the handheld "Contact" color sensor to select and import colors, and be assured that with the "Non-Contact" color sensor mounted in a web-press the print production output will "look right" once printed.

Some embodiments of the invention, having a detachable mounting for the color sensor, enable literally the same color sensor to be used for both "Non-Contact" or "Contact" color measurements (i.e. the same literal color sensor device is transferred back and forth between the web-press and the user's hand or a separate robotic measuring device).

Applications of the invention where color consistency is more important than the absolute color would particularly benefit from embodiments of the invention. In such embodiments time consuming "calibration procedures" could be abbreviated, and calibration data could be shared, all while still maintaining color production compliance. This would be even more so if the same "literal" color sensor is used for both "Non-Contact" or "Contact" measurements.

Details of the present invention are now discussed.

FIG. 1 is one example embodiment 100 of a dual-configuration "Non-Contact" and "Contact" color sensor device 102. The color sensor device 102 can be designed to measure colors either: reflected from an illuminated surface; radiated from a source (e.g. from LEDs, television screens, computer monitors, lamps, and so on); or which fluoresce (e.g. whiteners). When measuring colors reflected from an illuminated surface, one embodiment of the color sensor device 102 uses illuminants of various colors and a broad-band detection system. When measuring colors emitted by a radiating object (an emissive measurement); however, the color sensor device 102 not require illuminants, and would instead include color filters, gratings, prisms, and the like integrated into an optical path 114 (see below) of the color sensor device 102. Embodiments of the color sensor device 102 can be built which integrate both the reflected and radiated measurement modes, perhaps using a white light source (illuminated only for reflective measurements) and selected color filters. However, for many applications which require a good match between contact and non-contact measurements, an object under test (e.g. whose color is being measured) tends to be purely reflective. Embodiments of the color sensor device 102 can also be designed to measure shades of grey, or just black and white.

The color sensor device 102 includes a color sensor head 104 and a body portion 105. The color sensor head 104 includes: a removable tip 106, an aperture 108, illumination 110, a height sensor 112, an optical path 114, and a detector 116. The body portion 105 includes: an ADC (analog to digital converter) 118, a micro-controller 120, an interface connections 122, and a battery 124.

The removable tip 106 is typically attached to the color sensor device 102 when the color sensor device 102 is being used in the "Contact" mode (i.e. with the color sensor head 104 physically placed against a surface whose color is to be measured). In some embodiments, actual contact with the surface can be effected either with a user's hand, or by a robotic device. The removable tip 106 actually used depends upon each application of the color sensor device 102; however, in some handheld examples is a snub nose tip that can be more easily held to a fixed angle over the surface and which is more immune to angular variations than a narrow, pointed tip. In a "Non-Contact" mode (i.e. with the color sensor head 104 physically separated from the surface whose color is to be measured), the removable tip 106 is often removed from the color sensor head 104 so that the overall length of the color sensor device 102 is shorter (e.g. a shorter color sensor device 102 length may be preferred when the color sensor device 102 is installed in a web-press). The removable tip 106 is not required since the color sensor device 102 includes "height sensing" functionality.

The aperture 108, illumination 110, and optical path 114 together form a substantial part of the optical geometry of the color sensor device 102. While the ISO standard (e.g. ISO 13655) for certain color sensors specifies a 45°/0° "measuring geometry" (i.e. circular illumination 110 at 45° and a measurement aperture 108 placed at)0°, exactly how that ISO standard is optically and technologically implemented can vary substantially. Thus, the present invention's teaching of using substantially similar optical geometry and technology for both "Non-Contact" and "Contact" color sensor device 102 modes, achieves substantially greater measurement agreement and consistency between "Non-Contact" and "Contact" color sensor device 102 measurement results.

In one embodiment, illumination 110 is effected using 6 LEDs of varying wavelengths positioned at a 45° angle with respect to the 0° aperture 108 position. Light from each illumination 110 LED travels in roughly the same optical path, so as to form a reasonably tight illumination spot on the surface whose color is to be measured. Each of the illumination 110 LED's have a predetermined color accuracy specification. In some embodiments, an LED driver with a buffered interface is provided, thereby allowing for quicker drive-current changes, and reduced latency between color measurements.

The aperture 108 permits a known amount of reflected or radiated light (e.g. diameter of measurement spot) from the measured surface to reach the detector 116.

The optical path 114 routes the light passed by the aperture 108 through a set of lenses, filters, and optical cavities (e.g. optical wave guide, fiber optics, etc.) to the detector 116. In one embodiment integrated plastic optics (e.g. perhaps including a Fresnel lens) are used to achieve 45° illumination 110 and 0° imaging by the detector 116.

In some embodiments, because of illumination 110 angle variations, and other measurement variables, the color sensor device 102 measurement data varies with its height over the measurement surface. Thus, a height sensor 112, which includes an additional 2 illuminating LEDs, is used to compute the height between the detector 116 in the color sensor device 102 and the surface whose color is to be measured. The height sensor 112 is most often used in the "Non-Contact" mode of the color sensor device 102, such as when the color sensor device 102 is in a web-press) but is still functional in the "Contact" mode, perhaps to recomputed the height as various removable tips 106 are interchanged on the color sensor head 104. In one example embodiment, the height measurement is expected to be measured over a range centered about a nominal 12.5 mm height. Since attenuations, reflections, and accuracy of the height sensor 112 optics can affect the color data generated by the color sensor device 102, geometric and technology consistency of the height sensor 112 "Non-Contact" and "Contact" modes is another important variable to be held substantially constant.

In some example embodiments, one or more detectors 116 convert the optical reflectance or radiation signal, received through the aperture 108 and optical path 114, into one or more analog electrical signals. The detector 116 can be a densitometer, a colorimeter, a spectrophotometer, or other type of detection apparatus. The output of the detector 116 can be unfiltered; however, the color sensor device's 102 dynamic range is improved by filtering the detector 116 outputs. Having substantially similar detectors 116 in both the "Non-Contact" and "Contact" versions of the color sensor device 102 yields substantially similar and repeatable color measurements due to detector 116 consistency with respect to variables such as: color measuring principles/techniques; color measurement precision; and maximum continuous acquisition rates.

By keeping these and other innumerable technology component selections, optical pathways, and component placement variations consistent between the "Non-Contact" and "Contact" versions of the color sensor device 102, the present invention's measurement accuracy can be achieved.

Analog electrical signals generated by the detector 116 are received by the ADC 118 in the body portion 105 of the color sensor device 102. The ADC 118 converts the electrical signals into digital signals. Keeping the ADC 118 in close proximity to the detector 116, helps ensure that less capacitive and other electrical noise is picked up by the ADC 118, thereby improving the dynamic range of the color sensor device 102. ADC 118 quantization noise, driven by the resolution (i.e. # of data bits) of the ADC 118 is also a technology variation that when kept substantially consistent between the "Non-Contact" and "Contact" versions of the color sensor device 102, help keep measurement data from both embodiments substantially in agreement.

An embedded micro-controller 120, also in the body portion 105, process the digital signals from the ADC 118 and also controls a variety of other functionality within the color sensor device 102, including calibration functions, color measurement acquisition functions, data management, data interfaces, and battery management functions. The micro-controller 120 uses a set of color computations to transform the digital signals from the ADC 118 into a set of color measurement output data. The output data corresponds to one or more data types, such as RAW, XYZ, or LAB colorimetric data, and can include data types specific to spectral reflectance data. This data is then transmittable in a variety of formats, including: ASCII, for communication with an ASCII terminal, or HEX, for efficient communication with a host PC.

The interface connections 122 are application dependent, and may include a variety of data and/or power connection means, including: USB, wireless (e.g. Bluetooth connectivity), contact plates, and other connection systems and methods.

The battery 124 in one embodiment is a rechargeable battery that powers the color sensor device 102 when used in a handheld mode, but is recharged once the color sensor device 102 is inserted into a receptacle (e.g. receptacle 206) in a web-press, or other charging station.

Operation of the color sensor device 102, as controlled by the micro-controller 120, another controller (e.g. controller 214), or a program implemented on a computer, is now discussed.

Before color measurements are taken, the color sensor device 102 is typically calibrated. At least two types of calibration are possible, the first at a factory which manufactures the color sensor device 102. During this first calibration, the factory ensures that each color sensor device 102 using substantially similar optical geometries and technologies is tuned to yield a substantially similar color measurements, to account for manufacturing variability in the illumination 110 and height sensor 112 LEDs and to account for mechanical tolerances in the sensor head assembly. Tuning parameters associated with this first calibration are burned into the color sensor device's 102 non-volatile memory.

A second calibration during normal use of the color sensor device 102 (e.g. when monitoring a web-press, or being used as a handheld device) can be performed by the micro-controller 120, perhaps using BCRA tiles, should operation of the color sensor device 102 require adherence to some "standard" color measurement reading. However, if primarily "consistency" in color measurement is required, then each substantially similar color sensor device 102 will by design generate substantially similar color measurement data in its "as shipped from the factory" configuration, whether used in a "Non-Contact" or "Contact" manner.

Next, in response to an acquisition request, the micro-controller 120 effects a set of processes to capture a set of color measurement data. The acquisition request itself can be generated in response to a variety of stimuli, including: a button-press, a triggering event, once the removable tip 106 is pressed against a surface, or a command received from a host computer or controller.

In one example embodiment, each acquisition request causes the color sensor device 102 to effect the following sequence of events.

First, to help reduce "background light and electronic noise" an ambient light measurements is taken. A predetermined delay is added between subsequent ambient light measurements, so as to give the detector 116 electronics time to settle between acquisitions.

Second, eight "reflectivity" measurements are taken by the detector 116. Two of the eight measurements are to collect reflectance data for the height sensor 112 height calculation. Six of the eight measurements are to collect reflectance data from each of the six illumination 110 LEDs. Each of the six LEDs are illuminated sequentially. The resulting six reflectivity measurements are then computationally combined by the micro-controller 120, thereby completing the color measurement. Each measurement can have an integration time on the order of microseconds, with the entire color measurement taking a few milliseconds.

The color sensor device 102 can be configured to acquire either one color measurement or multiple color measurements in response to any given triggering event. Multiple color measurement acquisitions are useful for high-speed applications of the present invention, such as a need to take color measurements in quick succession on an operating web-press where color patches are printed in a regular sequence, and need to be constantly monitored. Additional data buffering capability can be added to the color sensor device 102 as required to handle this functionality.

Dual-Mode applications of a set of or even the same literal color sensor device 102 require functionality for "switching between" the "Non-Contact" or "Contact" modes (e.g. between "handheld" or "web-press" mode) in real-time. Switching can be implemented in one embodiment using one or more of the same variety of stimuli that generated the acquisition request, including: a button-press, a triggering event, once the removable tip 106 is pressed against a surface, a command received from a host computer or controller, detecting the color sensor device's 102 placement in a receptacle (e.g. such as receptacle 206 coupled to a platform such as web-press system 202) or not, and so on.

Upon detecting a "switch" between the "Non-Contact" or "Contact" mode, the micro-controller 120 can be programmed to either keep the current "height value" or recalculate the color sensor device's 102 height.

For example, if the color sensor device 102 is in its "handheld" mode and the removable tip 106 is in place the height of the color sensor is known and may not need to be recalculated. However, if the color sensor device 102 is in its "handheld" mode and the removable tip 106 is not in place, the height of the color sensor would likely vary and thus height should be recalculated in response to each acquisition command. Or, if the color sensor device 102 is in its "web-press" mode, the removable tip 106 will most likely have been removed, and since the height of the color sensor is likely to be fairly stable the height may only be recalculated once, perhaps when the color sensor device 102 is first placed in the receptacle 206.

Figure 2:
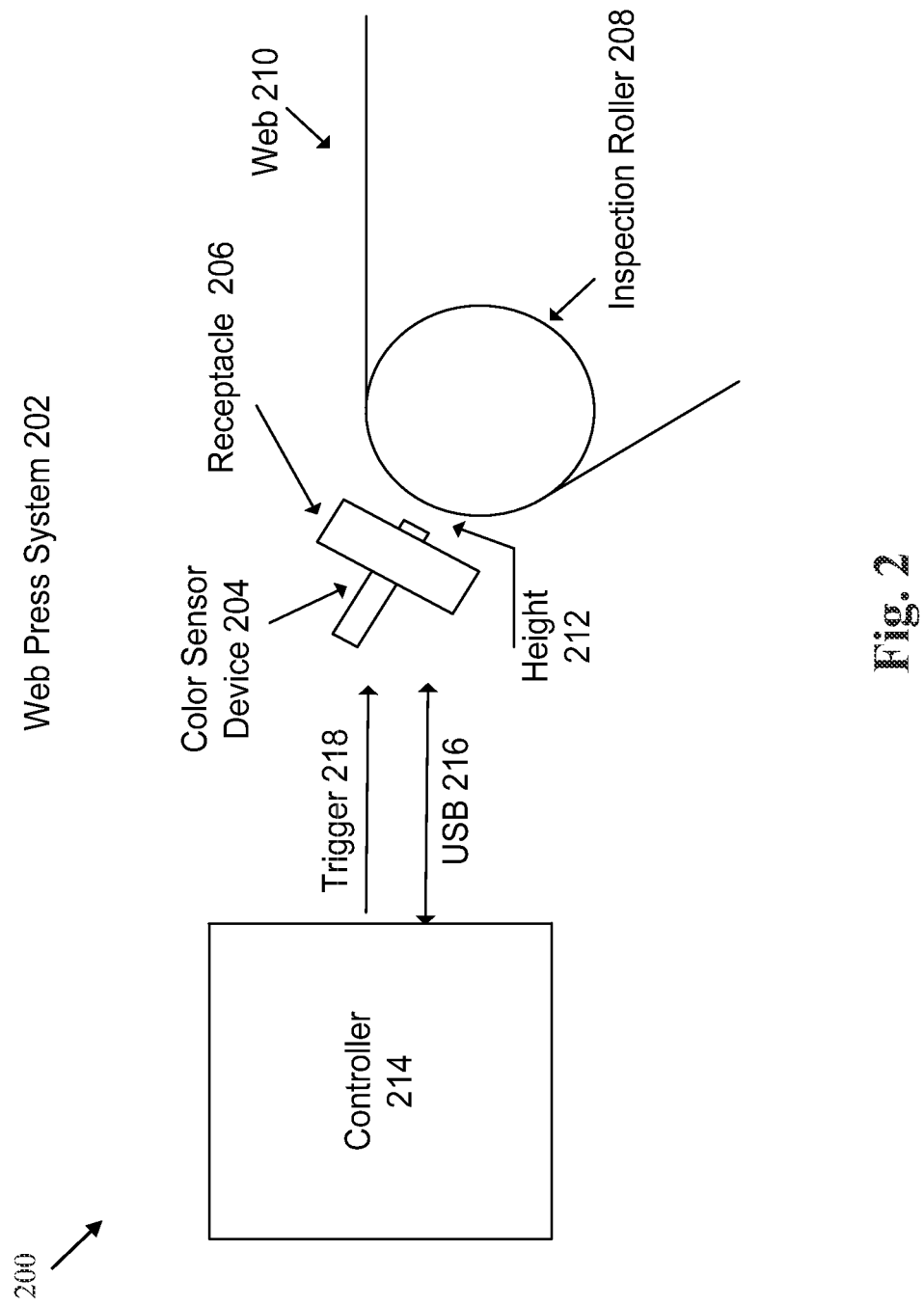
FIG. 2 is one example embodiment of a system using a "Non-Contact" and "Contact" color sensor device.

FIG. 2 is one example embodiment 200 of a web-press system 202 using the "Non-Contact" and "Contact" color sensor device 204. As shown in FIG. 2, a color sensor device 204, such as described in FIG. 1, is positioned within a receptacle 206 over an inspection roller 208 carrying a moving web 210.

The receptacle 206 holds the color sensor device 204 in a fixed position above the inspection roller 208. The receptacle 206 can hold the color sensor device 204 using a variety of application specific techniques, such as by a "press, friction fit", by a mechanical latching device, or behind a door structure. In other embodiments of the present invention, the receptacle 206 couples the color sensor device 204 to any platform (e.g. machine, test bench, support, surface, etc.) where the color sensor device 204 is to perform its function.

In this example embodiment, since the color sensor device 204 is in the web-press 202 the color sensor device 204 most likely will operate in the "Non-Contact" mode, without the removable tip 106. And while the color sensor device 204 can compensate for ambient light, the receptacle 206 design attempts to minimize the intrusion of ambient light since the removable tip 106 is no longer shielding the color sensor head 104.

In some example embodiments, the receptacle 206 is designed to permit extraction of the color sensor device 204 from the web-press 202 and operate in its "Contact" mode with the removable tip 106 in place. In this was the same "literal" color sensor device 204 can be used to capture color measurement data.

The color sensor device 204 is held at a known or measured height 212 above the web 210, and the inspection roller 208 is designed to constrict and/or damp the z-axis motion (i.e. height 212) of the web 210 beneath the color sensor device 204. The web 210 itself can be any material, such as a stream of paper being printed and/or finished in the web-press 202.

The color sensor device 204 is operated by a controller 214, perhaps through a USB 216 connection, but a wireless connection is also possible. The color sensor device 204 would also be powered through the USB 216 connection, or by some other means. The controller 214 can be a remote hardware and/or software based micro-controller or computer based device.

The controller 214 calibrates the color sensor device 204 and sends a trigger 218 signal to the color sensor device 204 for capturing a set of color measurement data, in a manner similar to that discussed for the micro-controller 120 in FIG. 1. The controller 214 then receives, post-processes, and perhaps analyzes the captured color measurement data to, provide either real-time color control for the web-press 202 or collect color quality control data for presentation to a print services customer.

The present invention may include an additional electronic apparatus (not shown). The electronic apparatus includes a processor device, a bus, a storage device, and algorithms.

The processor device includes a processor (such as a central processing unit, CPU, microprocessor, application-specific integrated circuit (ASIC), etc.) for controlling the overall operation of the storage device (such as random access memory (RAM) for temporary data storage, read only memory (ROM) for permanent data storage, firmware, flash memory, external and internal hard-disk drives, and the like).

The processor device communicates with the storage device and algorithms using the bus and performs operations and tasks that implement one or more blocks of the flow diagrams discussed herein. The storage device, for example, stores applications, data, programs, algorithms (including software to implement or assist in implementing embodiments in accordance with the present invention) and other data.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations thereof. It is intended that the following claims cover such modifications and variations as fall within the true spirit and scope of the invention.

What is claimed is:

1. An apparatus for color sensing, comprising:
a micro-controller to execute
instructions to operate a color sensor device under a contact color sensing operation; and
instructions to switch operation of the color sensor device to a non-contact color sensing operation in response to a triggering event.

2. The apparatus of claim 1, further comprising:
an aperture to receive a predetermined amount of light from a surface whose color is to be measured;
a detector to convert the light received by the aperture into analog electrical signals; and
an analog-to-digital converter to covert the analog electrical signals into digital signals, wherein the micro-controller is further to execute instructions to transform the digital signals into a set of color measurement output data.

3. The apparatus of claim 1, further comprising:
an illumination device to illuminate a spot on a surface whose color is to be measured, wherein the illumination device includes a plurality of LEDs having different wavelengths, and wherein the plurality of LEDs are to sequentially illuminate the spot.

4. The apparatus of claim 1,
a receptacle,
wherein the triggering event to switch the operation of the color sensor device includes the color sensor device being inserted into the receptacle.

5. The apparatus of claim 4, further comprising:
a battery in the color sensor device; and
a connector to charge the battery in the color sensor device when the color sensor device is placed in the receptacle.

6. The apparatus of claim 1, further comprising:
a removable tip coupled to the color sensor device,
wherein the triggering event to switch the operation of the color sensor device includes the removable tip being uncoupled from the color sensor device.

7. The apparatus of claim 1, further comprising:
a height sensor to calculate a height between the color sensor device and a surface whose color is to be measured,
wherein the micro-controller is further to execute instructions to recalculate the height between the color sensor device and the surface when the operation of the color sensor device switches.

8. The apparatus of claim 1, further comprising:
wherein the micro-controller is further to execute instructions to capture a set of color measurement data in response to a controller signal in the non-contact color sensing operation, and
instructions for capturing a set of color measurement data in response to a trigger being pulled by a user in the contact color sensing operation.

9. A apparatus for color sensing, comprising:
a micro-controller to execute
  instructions to operate a color sensor device under a non-contact color sensing operation; and
  instructions to switch operation of the color sensor device to a contact color sensing operation in response to a triggering event.

10. The apparatus of claim 9, further comprising:
a removable tip,
wherein the triggering event includes the removable tip being coupled to the color sensor device.

11. The apparatus of claim 9, further comprising:
a height sensor to calculate a height between the color sensor device and a surface whose color is to be measured.

12. The apparatus of claim 9, further comprising:
a receptacle,
wherein the micro-controller is to execute the color sensor device under the non-contact color sensing operation when the color sensor device is inserted into the receptacle, and
wherein the triggering event to switch the operation of the color sensor device includes the color sensor device being removed from the receptacle.

13. A apparatus comprising:
a color sensor device to operate under a contact color sensing operation; and
a receptacle detachably coupling the color sensor device to a platform,
wherein, in response to the color sensor device being inserted into the receptacle, the color sensor device is to be switched to operate under a non-contact color sensing operation.

14. The apparatus of claim 13, wherein the color sensor device further comprises:
an illumination device to illuminate a spot on a surface whose color is to be measured, wherein the illumination device includes a plurality of LEDs having different wavelengths, and wherein the plurality of LEDs are to sequentially illuminate the spot.

15. The apparatus of claim 13, wherein the receptacle prevents coupling of the color sensor device to the platform if a removable tip is coupled to the color sensor device.

16. The apparatus of claim 13, wherein the receptacle provides a signal to instruct the color sensor device to switch from the contact color sensing operation to the non-contact color sensing operation.

17. The apparatus of claim 13, wherein the receptacle includes one interface connection from a group including: a power connector, a data connector, a wireless connection, and contact plates.

18. The apparatus of claim 13, wherein the receptacle reduces an ambient light level reaching the color sensor device.

19. A method for color sensing, comprising:
execute instructions, by a micro-controller, to operate a color sensor device under a contact color sensing operation;
detecting a triggering event; and
execute instructions, by the micro-controller, to switch the color sensor device to a non-contact color sensing operation in response to a triggering event.

20. The method of claim 19, wherein the triggering event includes placing the color sensor device into a receptacle.

21. The method of claim 19, wherein the color sensor device includes a removable tip, and wherein the triggering event includes the removable tip being removed from the color sensor device.

* * * * *